C. R. FARGO AND P. O. UNGER.
POSTING APPARATUS.
APPLICATION FILED FEB. 21, 1920.
1,396,510.
Patented Nov. 8, 1921.
3 SHEETS—SHEET 1.
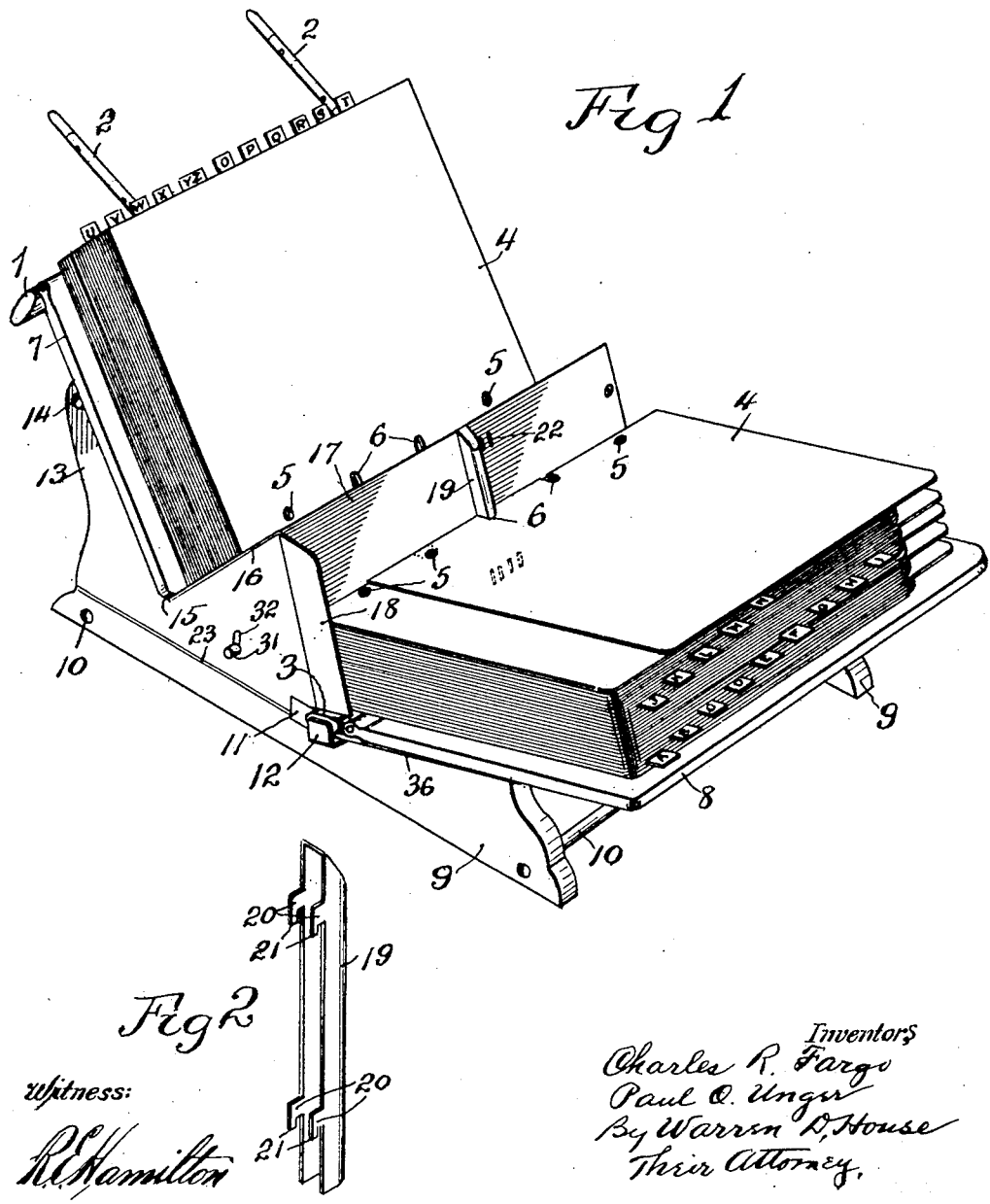

C. R. FARGO AND P. O. UNGER.
POSTING APPARATUS.
APPLICATION FILED FEB. 21, 1920.
1,396,510.
Patented Nov. 8, 1921.
3 SHEETS—SHEET 2.
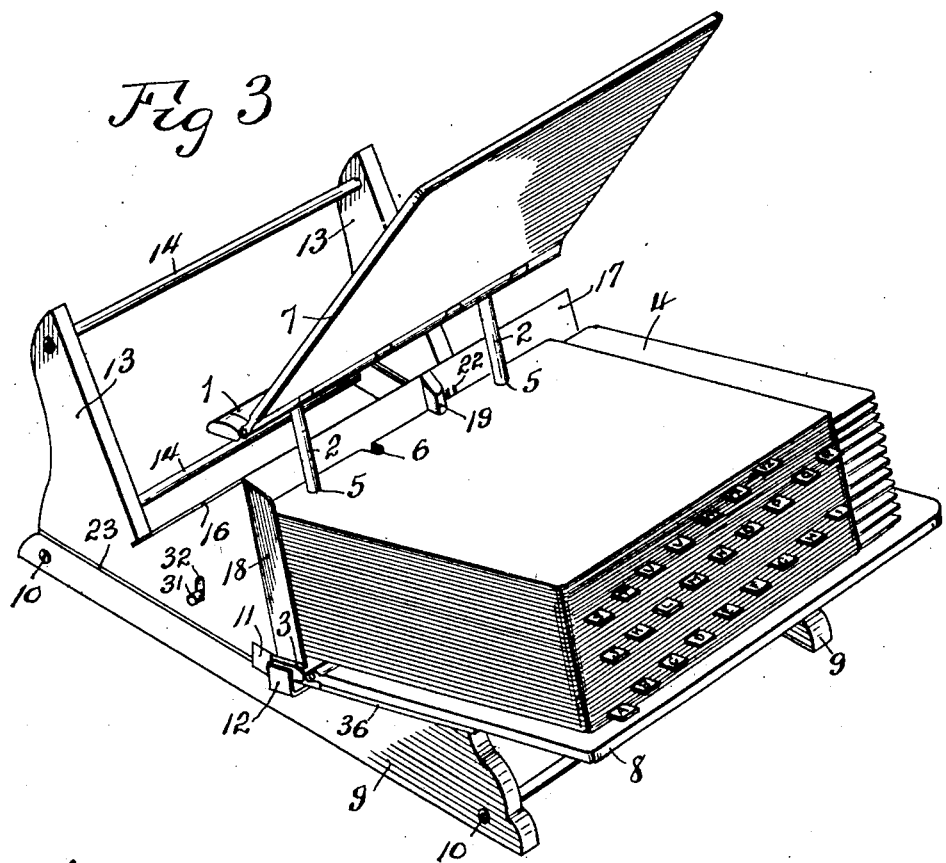
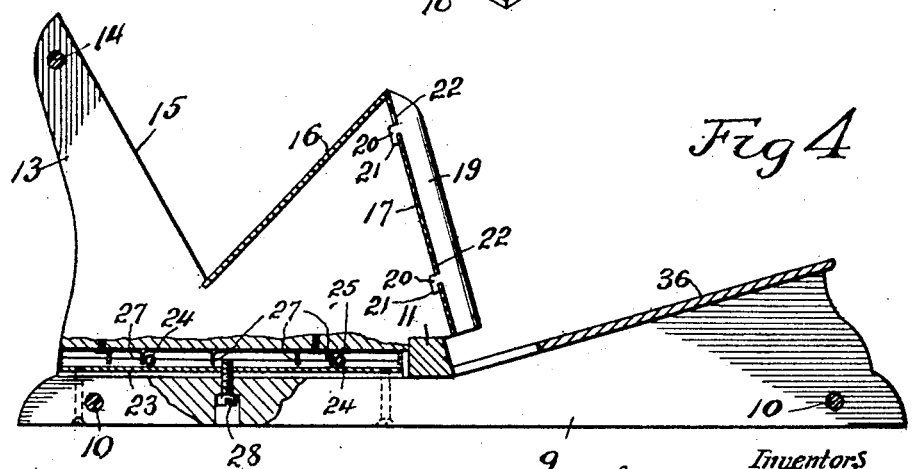

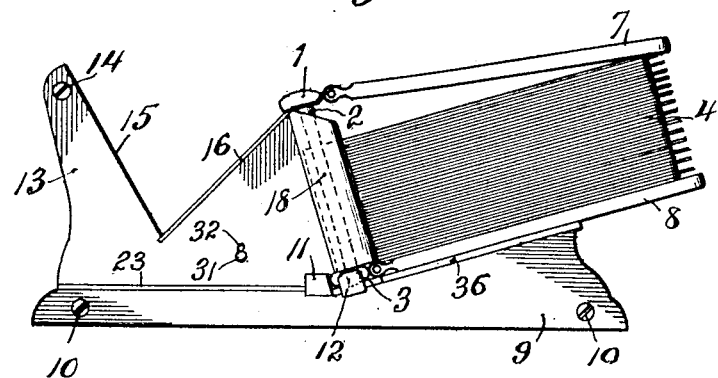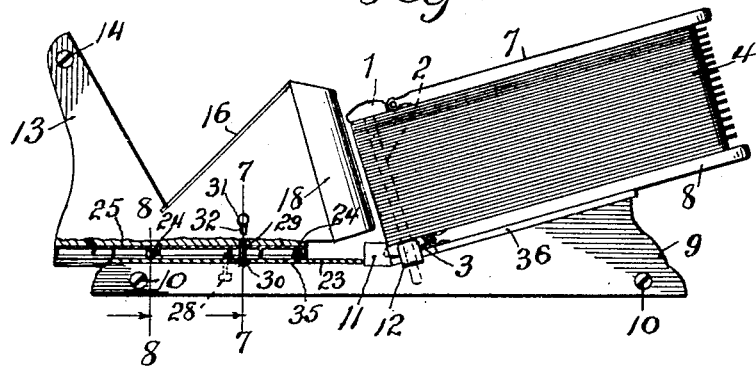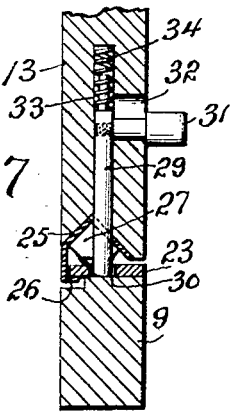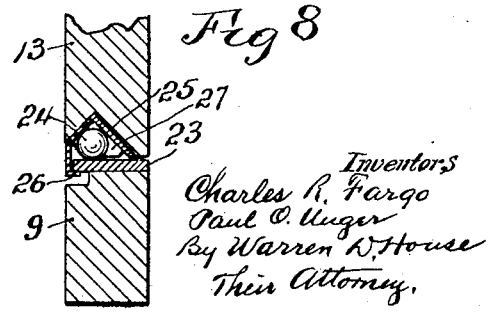

UNITED STATES PATENT OFFICE.

CHARLES R. FARGO AND PAUL O. UNGER, OF KANSAS CITY, MISSOURI, ASSIGNORS TO IRVING-PITT MANUFACTURING COMPANY, OF KANSAS CITY, MISSOURI, A CORPORATION OF MISSOURI.

POSTING APPARATUS.

1,396,510.　　　Specification of Letters Patent.　　Patented Nov. 8, 1921.

Application filed February 21, 1920. Serial No. 360,502.

*To all whom it may concern:*

Be it known that we, CHARLES R. FARGO and PAUL O. UNGER, citizens of the United States, residing at Kansas City, in the county of Jackson and State of Missouri, have invented a certain new and useful Improvement in Posting Apparatus, of which the following is a specification.

Our invention relates to improvements in posting apparatus.

The object of our invention is to provide a novel posting apparatus with which loose leaves may be readily registered, during a posting operation, in a normal or in an offset position, and while the leaves are held in the registered positions, adapted to allow them to be secured in such positions on the posts and between the two clamping members of an ordinary two-post binder.

A further object of our invention is to eliminate the use of loose pins, straps and similar devices for temporarily retaining the registered leaves in position.

A further object of our invention is to provide a posting apparatus which is simple in construction, cheap to manufacture, durable, not liable to get out of order and with which loose leaves may be readily and quickly handled.

Our invention provides still further a construction in which each one of a plurality of leaves whether in the normal or in the offset position while mounted between the clamping members of a two-post binder has at least one of the posts extending through it, thereby reliably retaining it against accidental displacement or removal from the binder.

Our invention provides further novel adjustable leaf offsetting means.

The novel features of our invention are hereinafter fully described and claimed.

In the accompanying drawings, which illustrate the preferred embodiment of our invention, Figure 1 is a perspective view of our improved posting apparatus showing the arrangement of the leaves during a posting operation.

Fig. 2 is a perspective view of the adjustable registering rib.

Fig. 3 is a perspective view of the posting apparatus showing the posts partly inserted through the registered leaves.

Fig. 4 is a vertical sectional view with the binder removed.

Fig. 5 is a side elevation, reduced, of the apparatus showing the parts in the registering position with the posts extending through the leaves and operatively engaging the other clamping member, the clamping member provided with the posts being shown supported by the movable leaf support.

Fig. 6 is a side elevation of the apparatus, partly broken away, showing the movable leaf support moved from the registering position and the leaves held clamped between the clamping members of the binder.

Fig. 7 is an enlarged vertical section on the line 7—7 of Fig. 6.

Fig. 8 is an enlarged vertical section on the line 8—8 of Fig. 6.

Similar reference characters designate similar parts in the different views.

1 designates one clamping member of an ordinary temporary binder provided with the usual two permanently attached extension posts 2 which are adapted to extend through and slidably and lockingly engage the other clamping member 3 of the binder.

4 designates loose leaves adapted to be releasably clamped between the clamping members 1 and 3, each leaf adjacent to one edge being provided with two holes 5 and intermediate of said two holes with two notches 6 adapted to receive the posts 2.

The clamping members 1 and 3 have respectively hinged to them in the usual manner covers 7 and 8.

For supporting and properly positioning the clamping member 3 and its cover 8, so that leaves may be laid thereon in proper register during the posting operation, there is provided a suitable support comprising a frame consisting of two longitudinal side members 9 which are connected together by means of bolts 10, and a transverse guide bar 11, the latter serving to form a gage against which is adapted to rest one longitudinal edge of the clamping member 3, when the latter is disposed transversely on the side members 9, as shown in Figs. 1, 3, 5 and 6 of the drawings.

For properly positioning clamping member 3 with respect to its lengthwise position, one of the side members 9 has attached to it adjacent to the bar 11 an angular stop plate 12 which is adapted to have rest against it one end of the clamping member 3.

For supporting the loose leaves 4 during the posting operation and prior to their being placed upon the clamping member 3 and cover 8, there is provided a leaf support, preferably longitudinally movable and which may comprise two side members 13 which are connected with each other by transverse bars 14, and each of which is provided on its upper edge with a V-shaped notch 15 in which is located one portion of an inverted V-shaped plate, said portion being inclined and designated by 16. The other portion 17 of said inverted V-shaped plate is inclined downwardly and forwardly and is adapted to engage one set of edges of loose leaves 4 which rest upon the clamping member 3. The other inclined portion 16 inclines downwardly and rearwardly and serves to support the lower edges of loose leaves 4 which are placed upon the cover 7 when the latter is disposed on the members 13 in a forwardly and downwardly inclined position in the notch 15, as shown in Fig. 1.

The end of the portion 17 which is adjacent to the gage plate 12, is provided with a right-angled forwardly extending flange 18, which is adapted to engage one set of edges of the loose leaves 4 which are supported on the clamping member 3. The portion 17 and the flange 18 serve to properly register the loose leaves 4 in a normal position on the clamping member 3.

In order that the loose leaves 4 may in the posting operation be offset from the normal position and still be in position to be operatively engaged by the posts 2 on the clamping member 1, there is provided a registering device which consists preferably of a channel-shaped rib 19, each side flange of which, as shown in Fig. 2, is provided with a pair of rearwardly extending tongues 20, each having a downwardly extending projection 21.

The portion 17 of the inverted V-shaped plate is provided with two sets of slots 22, each set of which is adapted to receive therethrough respectively the tongues 20. Two sets of slots are provided to enable the rib 19 to be adjusted laterally to either of two positions to accommodate the device for loose leaves having the notches 6, which are adapted to receive the rib 19, in different positions, such as sometimes occurs in loose leaves of different widths.

In attaching the rib 19 to the portion 17 of the plate, the tongues 20 and their extensions 21 are inserted through the proper slots 22, after which the rib is slipped downwardly to the position shown in Fig. 4, in which position the extensions 21 embrace the rear side of the portion 17.

In order that the registering portion 17 and its flange 18 may be moved longitudinally rearwardly from the registering position to enable the clamping member 1 to be forced downwardly to the clamping position, shown in Fig. 6, the leaf support comprising the side members 13, bars 14 and plate 16 is longitudinally movably mounted on the side members 9. The leaf support may be movably mounted in any suitable manner. In the structure shown in the drawing, each side member 9 has attached to its upper edge, at the rear of the bar 11 a horizontal longitudinal flat plate 23 Figs. 7 and 8, on which are mounted balls 24 which run in and support a longitudinal inverted V-shaped plate 25, which is secured to the lower edge of the adjacent side member 13 of the leaf support. One flange of the plate 25 has a lateral extension 26 which is adapted to engage the lower side of the adjacent plate 23 to retain the side members 13 in their operative positions, the extensions 26 being on the inner sides of the members 9.

To retain the balls 24 in their proper positions in the plates 25, the latter are each provided with a plurality of downwardly extending transverse flanges 27, so located as to enable the balls to have a limited range of movement.

For limiting the movement of the leaf support, there is provided in each side member 9 a vertical screw 28, Fig. 4, which extends through the adjacent plate 23 and between two of the transverse flanges 27.

For releasably locking the leaf supporting members 13 in the rearward position shown in Fig. 6, there is vertically slidably mounted in one of the members 13 a vertical bolt 29, Fig. 7, which extends through a vertical hole in the adjacent plate 25 and is adapted to enter a vertical hole 30 which is provided in the adjacent plate 23. Attached to the bolt 29 is a transverse pin 31, which is vertically movable in and extends outwardly through a vertical slot 32 which is provided in the adjacent side member 13.

The bolt 29 is slidably mounted in a vertical hole 33 in the adjacent member 13. Mounted in said hole 33 is a coil spring 34, the lower end of which bears against the bolt 29 and the upper end of which bears against the adjacent member 13. The spring 34 normally forces the bolt 29 downwardly to the locking position.

In order that the leaf support may be locked in the sheet registering position shown in Figs. 1, 3, 4 and 5, the plate 23 which is provided with the hole 30 is also provided with a vertical hole 35, which is adapted to receive the bolt 29 when the leaf support is in the registering position.

For supporting the cover 8 in an inclined position at right angles to the portion 17 of the registering plate, there may be provided a rearwardly and downwardly inclined plate 36 which is secured to the upper inclined edges of the members 9 forward of the transverse bar 11.

In the operation of the apparatus, the cover 7 is placed in the rearwardly and upwardly inclined position in the notch 15 on the members 13, as shown in Fig. 1. The loose leaves are then all placed on the cover 7 with their lower edges resting on the portion 16 of the registering plate. The clamping member 3 is then mounted transversely on the members 9 with its rear longitudinal edge against the bar 11, and with one end resting against the plate 12, Fig. 1. The cover 8 rests upon the plate 36. The loose leaves 4 are then shifted from the portion 16 to the top of the cover 8 and the clamping member 3. Those leaves which are to be in the normal position are disposed with the edges adjacent to the holes 5 and notches 6 resting against the forward side of the portion 17 of the registering plate, one adjacent set of edges being disposed against the flange 18. In this position of the leaves the holes 5 will be in register with the holes on the member 3 which receive the posts 2. Those leaves which are to be offset are placed with one set of edges resting against the portion 17 and in a position such that the rib 19 will be in the left hand notches 6, looking rearwardly. The position of the rib 19 and the arrangement of the holes 5 and notches 6 are such that the right hand notches 6 of the offset leaves will aline with the right hand holes of the leaves which are in the normal position.

After all the leaves have been transferred onto the cover 8, the posts 2 are passed downwardly through the holes 5 of the leaves which are in the normal position, the right hand post passing through the right hand notches of the offset leaves. The posts 2 will then be forced into the holes in the member 3, thereby holding the leaves and the member 3 in their proper positions with the clamping member 1 resting on the top of the portion 17 of the registering plate. The bolt 29 will then be lifted by means of the pin 31 so as to be above the plate 23, at which time the leaf support and with it the plate 17 may be forced rearwardly to the position shown in Fig. 6, when the pin 31 is released, thereby permitting the spring 34 to force the bolt 29 into the hole 30, thus locking the leaf support in the rear position. The clamping member 1 can then be forced downwardly until it clamps the leaves tightly against the member 3, the latter at this time being locked in the usual manner to the posts 2. The leaves will thus be tightly held in the binder, which may be then removed from the posting apparatus.

The bolt 29 may then be lifted to the unlocked position, and the leaf support moved to the registering position shown in Fig. 1, at which time the bolt 29 is again released and permitted to be forced by the spring 34 into the hole 35. The apparatus is now in position for another posting operation.

From the foregoing, it will be understood that after the leaves have been properly registered, the posts 2 may be inserted through the holes 5 and into engagement with the clamping member 3, thereby holding the leaves in the proper position and preventing their displacement when the movable leaf support is moved from the registering position to permit the clamping member 1 being forced to the clamping position, and that this operation is effected with the use of an ordinary two post binder without detachable locking pins or other accessories.

We do not limit our invention to the structure shown and described, as many modifications, within the scope of the appended claims, may be made without departing from the spirit of our invention.

What we claim is:—

1. In a posting apparatus, the combination with a binder having two clamping members, one having two posts for receiving loose leaves, the other member being adapted to slidably engage said posts, of leaves, each having two holes for respectively receiving said posts and two edge notches intermediate of said holes adapted to receive said posts, the holes and the notches being spaced at equal distances apart.

2. In a posting apparatus, a leaf having two holes and two edge notches intermediate of said holes, the holes and notches being spaced at equal distances apart and adapted to receive two posts of a loose leaf binder.

3. In a posting apparatus, the combination with a binder having two clamping members, one having posts for receiving loose leaves, the other member being adapted to slidably engage said posts, of leaves, each having two holes and two edge notches intermediate of said holes and all adapted to receive said posts, the holes and notches being spaced at equal distances apart, a support having positioning means for one of said members, and means thereon adapted to coöperate with either of said notches for registering the leaves in a normal or in an offset position.

4. In a posting apparatus, the combination with a binder having two clamping members, one having a post for receiving loose leaves, the other member being adapted to slidably engage said post, of leaves, each having a hole and an edge notch and each adapted to receive said post, when the leaf is in proper register in the normal and off-set positions respectively.

5. In a posting apparatus, the combination with a binder having two clamping members, one having a post for receiving loose leaves, the other being adapted to slidably engage said post, of leaves, each having a hole adapted to receive said post and having two edge notches, a support having positioning means for one of said members, and means thereon adapted to coöperate with said notches for registering the leaves in either a normal or an offset position.

6. In a posting apparatus, the combination with a binder having two clamping members, one having two posts for receiving loose leaves, the other member being adapted to slidably engage said posts, of leaves, each having two holes and two edge notches intermediate of said holes adapted to receive said posts, a support having positioning means for the slidable member, and leaf registering means adapted to coöperate with either of said notches for registering the leaves supported upon said slidable member in either a normal or an offset position, said posts being insertible through said holes when the leaves are in the normal position, one of the posts being insertible through one set of notches when the leaves are in the offset position.

7. In a posting apparatus, the combination with a binder having two clamping members, one having two posts permanently attached thereto, of a support for the other member, and means for registering leaves on the other member in a normal or in an offset position, said two posts being adapted to operatively engage the leaves in said positions and at the same time to operatively engage the other member when the latter is in the registering position.

8. In a posting apparatus, the combination with a binder having two clamping members, one having two posts permanently attached thereto, of a support having positioning means for the other member, and means for registering leaves on the other member in a normal or in an off-set position, said posts being adapted to operatively engage the leaves in said positions and at the same time to operatively engage the other member when the latter is properly positioned on said support.

9. In a posting apparatus, the combination with a binder having two clamping members, one having a post permanently attached thereto, of a support for the other member, and a registering member on said support adapted to enter notches provided in the edges of loose leaves for registering the leaves in a normal or in an off-set position, said post being adapted to operatively engage the leaves in said positions and for operatively engaging the other member when the latter is properly positioned in the registering position on said support.

10. In a posting apparatus, the combination with a binder having two clamping members, one having a post permanently attached thereto, of a support having positioning means for the other member, and a registering member on said support adapted to enter notches in the edges of loose leaves for registering the leaves in a normal or in an offset position, said post being adapted to operatively engage the leaves in said positions and for operatively engaging at the same time the other member when the latter is properly positioned in the registering position on said support.

11. In a posting apparatus, the combination with a binder having two clamping members, one having a post, of a support having positioning means for the other member, loose leaves each having a hole and two edge notches spaced at equal distances apart, and a registering member on said support adapted to enter said notches for registering the leaves in a normal or in an offset position, said post being adapted to operatively engage the other member when the latter is properly positioned on said support and at the same time to extend through the holes of such leaves as are in the normal position.

12. In a posting apparatus, the combination with a binder having two clamping members, one having two posts, of a support having positioning means for the other member, loose leaves, each having two holes and two edge notches intermediate of said holes and spaced at equal distances apart with the holes, and a registering member on said support adapted for entering said notches for registering the leaves in a normal or in an offset position, said posts being adapted to operatively engage said other member when the latter is properly positioned on the support and at the same time to extend through the holes of the leaves which are in the normal position.

13. In a posting apparatus, a support for a binder member, loose leaves, each having two holes and two notches in one edge intermediate of said holes, and sheet registering means comprising a leaf edge engaging member adapted to engage the notched edge of each leaf and having a rib adapted to enter one of said notches of each leaf when the latter is in a normal or in an offset position, the notches and holes being spaced at equal distances apart.

14. In a posting apparatus, the combination with a binder having two clamping members, one having two posts, of a support for the other binder member, the latter member being adapted for operative engagement with said posts, and leaf registering means for engaging the edges of loose leaves carried by said other binder member, the posts being insertible through said loose leaves and into operative engagement with the other binder member, when the leaf registering means is in the registering position, said registering means being movable from the registering position after the posts have operatively engaged the leaves and the other binder member.

15. In a posting apparatus, the combination with a binder having two clamping members, one having two posts adapted for operative engagement with the other binder member, of a support for said other binder member, and leaf registering means arranged to register loose leaves in a normal and in an offset position, said posts being insertible through said loose leaves when the registering means is in the registering position, the registering means being movable to and from the registering position.

16. In a posting apparatus, the combination with a binder having two clamping members, one having two posts adapted for operatively engaging the other member, of a support for said other member having means for properly positioning said other member, and leaf registering means for engaging the edges of loose leaves carried by the other binder member, said posts being insertible through said loose leaves when the registering means is in the registering position, the registering means being movable to and from the registering position.

17. In a posting apparatus, the combination with a binder having two clamping members, one having two posts adapted to operatively engage the other member, of a support for said other member, and leaf registering means adapted to engage the edges of loose leaves carried by said other member and having a registering device adapted to engage notches in said edges, said post being insertible through said leaves and into operative engagement with the other binder member when the registering means is in the registering position, said registering means being movable to and from the registering position.

18. In a posting apparatus, the combination with a binder having two clamping members, one having two posts adapted for operatively engaging the other member, of a support for said other member having means for properly positioning said other member, and leaf registering means for engaging the edges of loose leaves carried by said other member, said posts being insertible through said loose leaves and into operative engagement with said other member while the positioning means and registering means are respectively operatively engaging said other member and the leaves.

19. In a posting apparatus, the combination with a binder having two clamping members, one having two posts adapted to operatively engage the other member, of a support for said other member having means for properly positioning said other member transversely on said support, and leaf registering means for engaging the edges of loose leaves carried by said other member, said posts being insertible through said loose leaves and into operative engagement with said other member while the positioning means and registering means are respectively operatively engaging said other member and the leaves.

20. In a posting apparatus, the combination with a binder having two clamping members, one having two posts adapted to operatively engage the other member, of a support for said other member having means for properly positioning said other member transversely on said support, and leaf registering means for engaging the edges of loose leaves carried by said other member, said posts being insertible through said leaves and into operative engagement with said other member while the positioning means and said registering means are respectively operatively engaging said other member and said leaves, the registering means being movable to and from the registering position.

In testimony whereof we have signed our names to this specification.

CHARLES R. FARGO.
PAUL O. UNGER.